United States Patent [19]
Stein

[11] Patent Number: 6,072,161
[45] Date of Patent: Jun. 6, 2000

[54] BEVERAGE CONTAINER

[76] Inventor: Todd Anthony Stein, 5050 Pear Ridge Dr., #3509, Collin County, Dallas, Tex. 75287

[21] Appl. No.: 08/906,276

[22] Filed: Aug. 5, 1997

Related U.S. Application Data

[60] Provisional application No. 60/023,798, Aug. 6, 1996.

[51] Int. Cl.[7] .............................. A47J 27/21; A47J 36/24; F27D 11/02; H05B 1/02
[52] U.S. Cl. .......................... 219/432; 219/435; 219/386; 219/387
[58] Field of Search ...................................... 219/385, 386, 219/432, 435, 441, 521, 387; 222/146.5, 146.2; 224/926; 206/485.1, 487; 215/314; 439/135–137, 140; 429/96, 100

[56] References Cited

U.S. PATENT DOCUMENTS

| | | | |
|---|---|---|---|
| D. 243,379 | 2/1977 | Meeks | D7/45 |
| 1,219,908 | 3/1917 | Both | 439/140 |
| 3,233,203 | 2/1966 | Kennedy et al. | 439/140 |
| 3,290,484 | 12/1966 | Day | 219/441 |
| 3,432,641 | 3/1969 | Welke | 219/441 |
| 3,488,473 | 1/1970 | Sanders | 219/432 |
| 3,890,484 | 6/1975 | Kamins et al. | 219/432 |
| 3,931,494 | 1/1976 | Fisher et al. | 219/441 |
| 4,095,090 | 6/1978 | Pianezza | 219/441 |
| 4,801,782 | 1/1989 | Ineson | 219/438 |
| 4,812,623 | 3/1989 | Haden et al. | 219/432 |
| 4,827,107 | 5/1989 | Peery | 219/521 |
| 4,922,355 | 5/1990 | Dietz et al. | 362/101 |
| 4,959,528 | 9/1990 | Malloy | 219/432 |
| 4,980,539 | 12/1990 | Walton | 219/432 |
| 5,072,095 | 12/1991 | Hoffmann | 219/432 |
| 5,208,896 | 5/1993 | Katayev | 392/444 |
| 5,243,684 | 9/1993 | Edwards | 392/444 |
| 5,283,420 | 2/1994 | Montalto | 219/432 |
| 5,466,164 | 11/1995 | Miyazaki et al. | 439/140 |
| 5,508,494 | 4/1996 | Sarris et al. | 219/386 |

FOREIGN PATENT DOCUMENTS

| | | |
|---|---|---|
| 694282 | 12/1930 | France . |
| 907269 | 3/1946 | France . |

*Primary Examiner*—Joseph Pelham
*Attorney, Agent, or Firm*—Lisa L. B. Yociss

[57] ABSTRACT

A beverage container is disclosed for keeping liquid evenly heated. The beverage container includes a cup, a heating element, and a removable battery power source. The cup has an inner sidewall surface, an outer sidewall surface, an inner bottom surface, and an outer bottom surface. The inner sidewall surface and inner bottom surface are shaped to hold liquid. The heating element is completely enclosed between the inner sidewall surface and the outer sidewall surface. The heating element heats the inner sidewall surface which then heats the liquid. An insulating layer is included between the heating element and the outer sidewall surface to keep the outer sidewall surface cool while the inner sidewall surface is heated. The battery power source is capable of being temporarily secured to the outer bottom surface of the cup and is utilized to keep the heating element energized to a predetermined level while the battery power source is secured to the cup. When the battery power source is removed, the cup is capable of being submerged in water without damaging the cup. When the battery power source is attached, the beverage container is portable.

16 Claims, 4 Drawing Sheets

BEVERAGE CONTAINER

CROSS-REFERENCE TO RELATED PATENT APPLICATIONS

The present invention is related to the subject matter of co-pending provisional patent application Ser. No. 60/023,798 filed on Aug. 6, 1996, entitled "Hot Cup", by Todd Anthony Stein.

BACKGROUND OF THE INVENTION

1. Technical Field

The present invention relates to a beverage container, and in particular to a heated beverage container including a cup, a heating element enclosed within the cup, and a removable battery power source. Still more particularly, the present invention relates to a heated beverage container including a cup, a heating element enclosed within the cup, and a removable battery power source, wherein the cup is watertight and capable of being submerged in water when the battery power source is removed without damaging the cup, and further wherein the cup and battery power source are portable when the battery power source is attached.

2. Description of the Related Art

Known methods and devices for heating beverage containers typically include a heating element secured to the bottom of the container, or a heating element on which the container rests. These devices heat the container and liquid through the bottom of the container. These devices have a tendency to overheat liquid in the bottom of the container while allowing liquid at the top of the container to cool. Therefore, the liquid will not be maintained at a constant, desired temperature.

These devices typically include a cup which is temporarily coupled to a heating element for warming the liquid in the cup. Once the liquid is warm, the cup is removed from the heating element and utilized. Other devices include a heating element formed in the bottom of the cup which is temporarily connected to a power source for warming the liquid. Once the liquid is warm, the cup and heating element are removed from the power source and utilized. In both of these types of devices, the liquid is allowed to cool while the cup is used. In order to warm the liquid, the cup must be reconnected to either the heating element or the power supply.

SUMMARY OF THE INVENTION

A beverage container is disclosed for keeping liquid evenly heated. The beverage container includes a cup, a heating element, and a removable battery power source. The cup has an inner sidewall surface, an outer sidewall surface, an inner bottom surface, and an outer bottom surface. The inner sidewall surface and inner bottom surface are shaped to hold liquid. The heating element is completely enclosed between the inner sidewall surface and the outer sidewall surface. The heating element heats the inner sidewall surface which then heats the liquid. An insulating layer is included between the heating element and the outer sidewall surface to keep the outer sidewall surface cool while the inner sidewall surface is heated. The battery power source is capable of being temporarily secured to the outer bottom surface of the cup and is utilized to keep the heating element energized to a predetermined level while the battery power source is secured to the cup. When the battery power source is removed, the cup is capable of being submerged in water without damaging the cup. When the battery power source is attached, the beverage container is portable.

A battery charger is also supplied to recharge a battery included within the battery power source. The battery charger is capable of being temporarily secured to a bottom of the battery power source.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
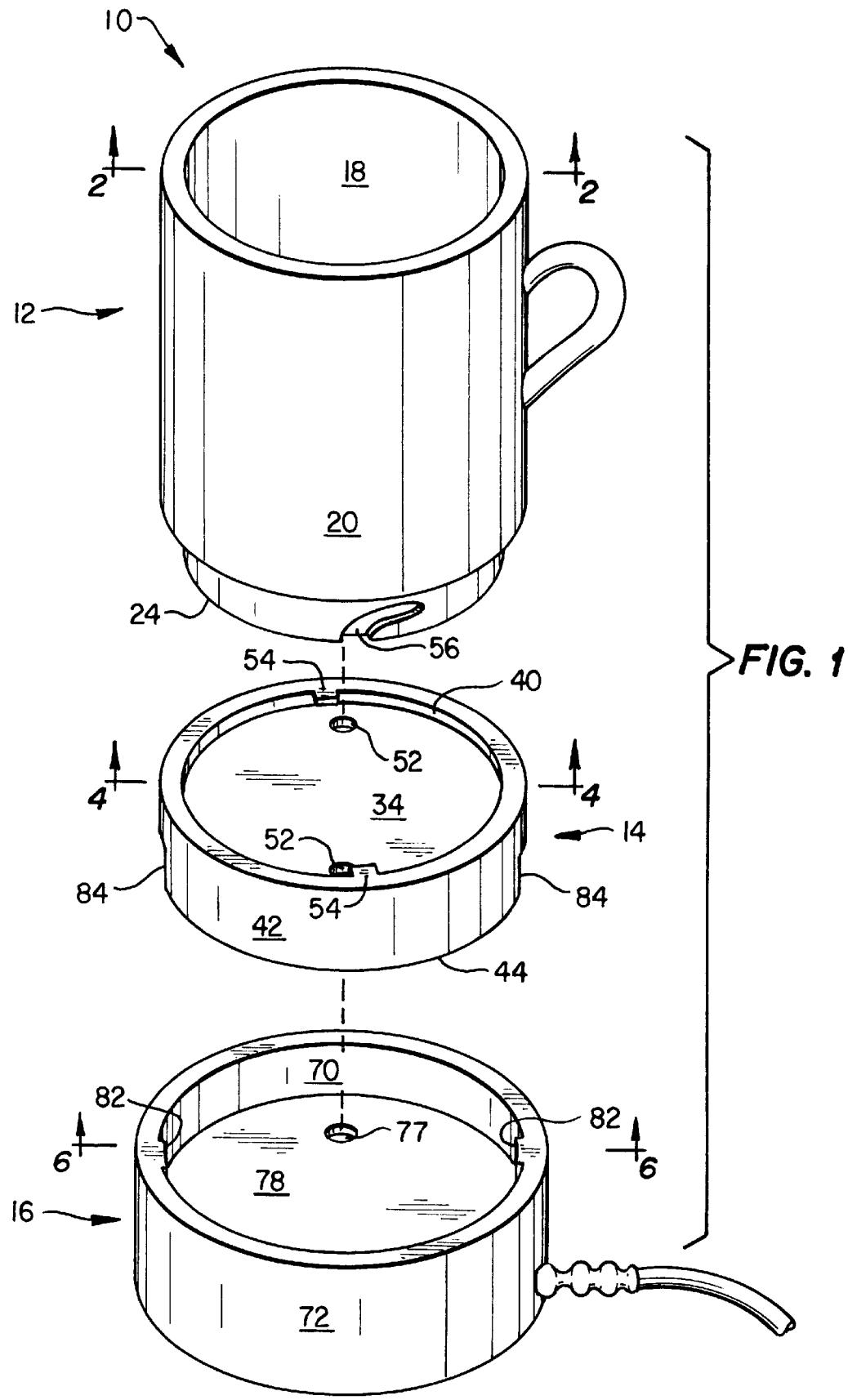
FIG. 1 is a perspective view of a beverage container in accordance with the present invention.
Figure 2:
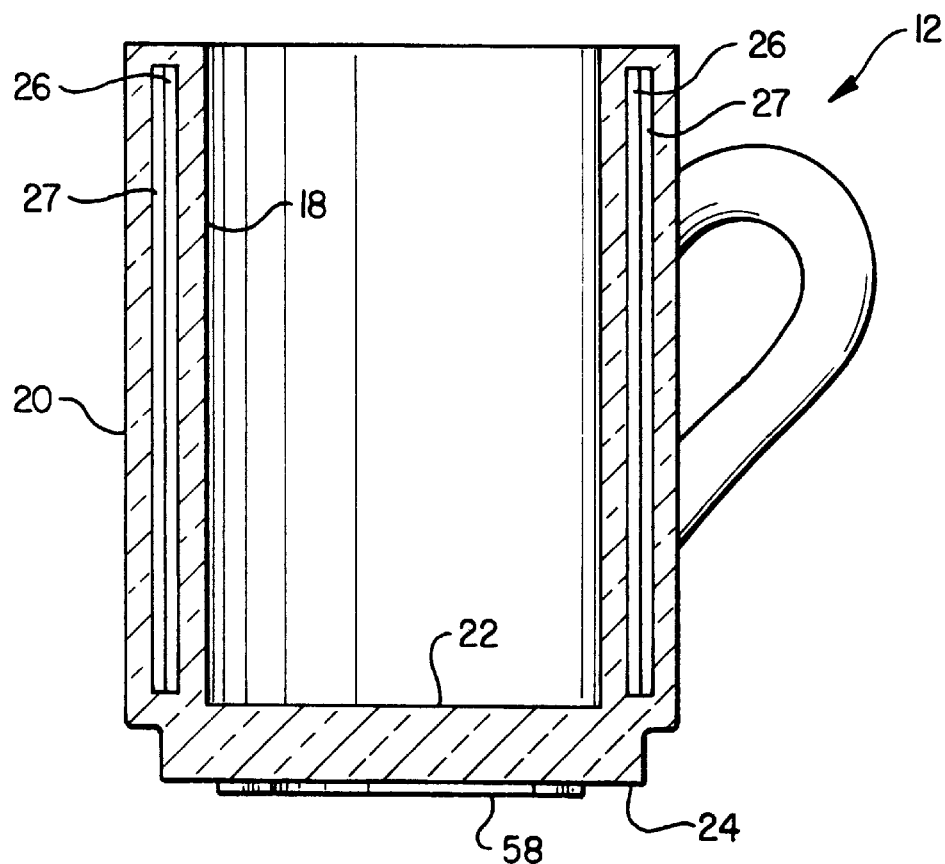
FIG. 2 is a side cross-sectional view of a cup taken along line 2—2 shown in FIG. 1 in accordance with the present invention.
Figure 3:
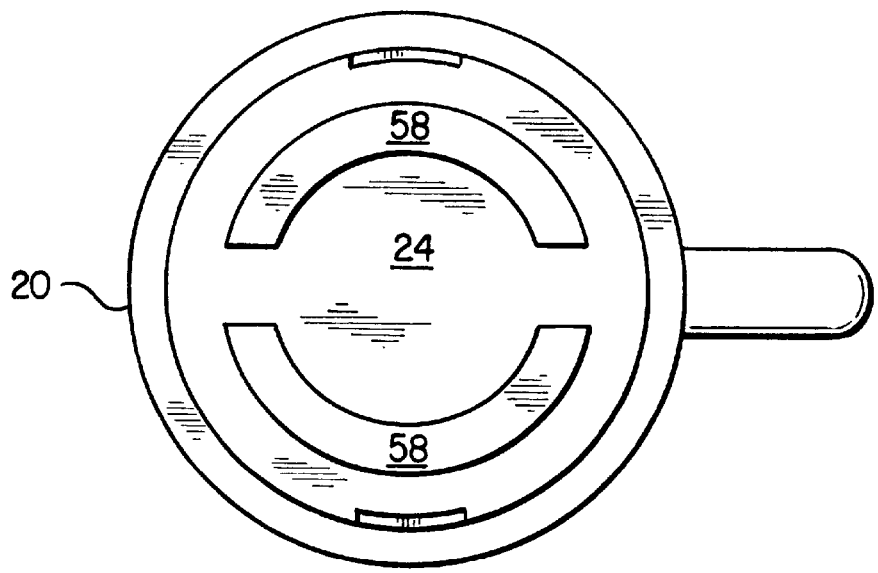
FIG. 3 is a bottom view of a cup in accordance with the present invention.
Figure 4:
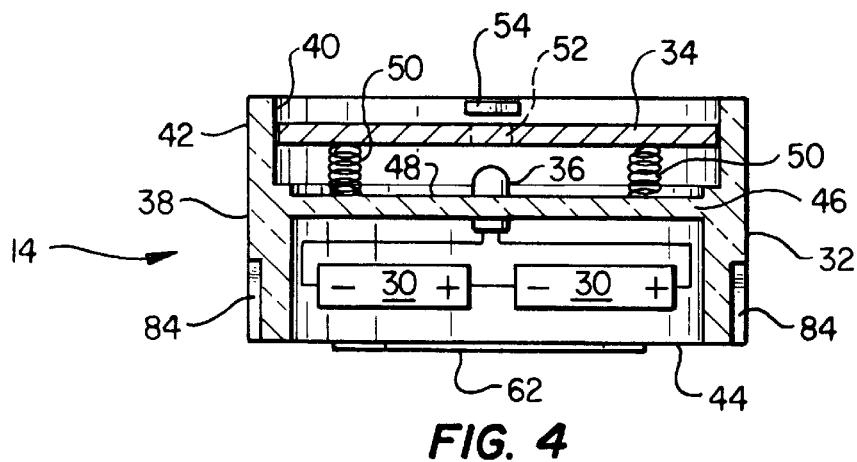
FIG. 4 is a side cross-sectional view of a battery power source taken along line 4—4 shown in FIG. 1 in accordance with the present invention.
Figure 5:
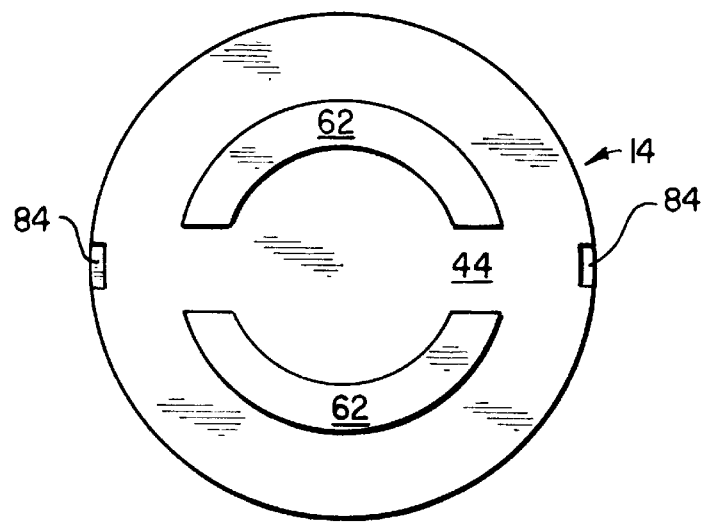
FIG. 5 is a bottom view of a battery power source in accordance with the present invention.
Figure 6:
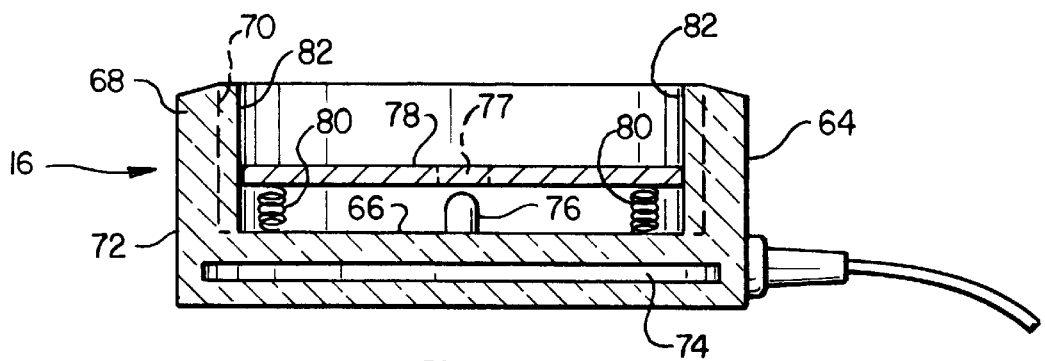
FIG. 6 is a side cross-sectional view of a battery charger taken along line 6—6 shown in FIG. 1 in accordance with the present invention.
Figure 7:
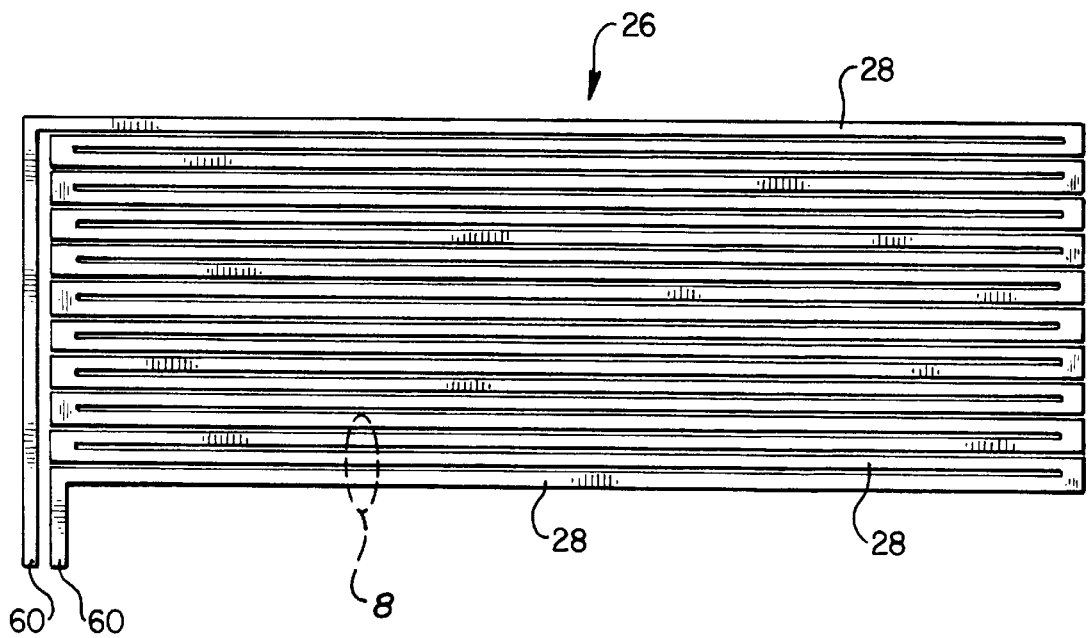
FIG. 7 is a side view of a heating element in accordance with the present invention.
Figure 8:
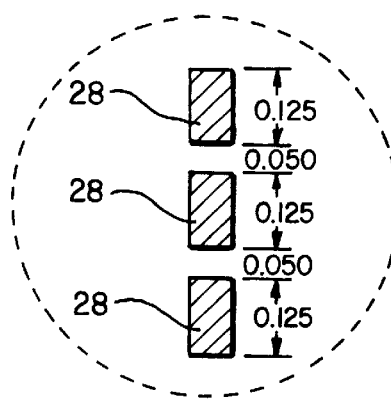
FIG. 8 is a side cross-sectional view of a heating element taken along line 8 shown in FIG. 7 in accordance with the present invention.

A preferred embodiment of the present invention and its advantages are better understood by referring to FIGS. 1–8 of the drawings, like numerals being used for like and corresponding parts of the accompanying drawings.

A heated beverage container 10 includes a cup 12, a battery power supply 14, and a battery charger 16. Cup 12 may be temporarily secured to battery power supply 14 while cup 12 is in use in order to maintain liquid held within cup 12 at an elevated temperature. Battery power supply 14 may be temporarily secured to battery charger 16 in order to recharge batteries included with battery power supply 14.

Cup 12 is preferably formed from ceramic, polycarbonate, or any other easily moldable plastic material which can withstand temperatures up to 212 degrees F. Cup 12 includes an inner sidewall surface 18, an outer sidewall surface 20, an inner bottom surface 22, and an outer bottom surface 24. Inner sidewall surface 18 and inner bottom surface 22 are shaped to hold liquid.

A heating element 26 is included and is completely enclosed between inner sidewall surface 18 and outer sidewall surface 20. Heating element 26 heats inner sidewall surface 18 and thereby heats any liquid contained within cup 12. An insulating layer 27 is enclosed between outer sidewall surface 20 and heating element 26 in order to keep outer sidewall surface 20 cool while inner sidewall surface 18 is heated. Insulating layer 27 is preferably formed from a silicon rubber material. Because heating element 26 is completely enclosed between inner sidewall surface 18 and outer sidewall surface 20, cup 12 is watertight. Therefore, cup 12 may be submerged in water to permit easy cleaning.

Heating element 26 is shaped to maintain an even and consistent temperature throughout inner sidewall surface 18 when heating element 26 is energized. Heating element 26 comprises a plurality of equidistantly spaced and interconnected element lines 28. Element lines 28 are interconnected so that heating element 26 is a single continuous thin strip of heat conducting material. Preferably, the heating conducting material is a combination of nickel and chrome. Preferably, the combination is 80% nickel and 20% chrome.

When battery power source 14 is attached to cup 12, battery power source 14 keeps heating element 26 energized to a predetermined level. Preferably, the level is 4 watts. The level is determined both by the voltage level supplied by the battery included within battery power source 14, and by the shape and placement of element lines 28. In order to dissipate 4 watts utilizing a battery or batteries capable of supplying a total of 3.6 volts, each element line is 0.125 inches wide and spaced 0.050 inches from the closest element line. Those skilled in the art will recognize that other alloys may be utilized to achieve the same result described above. Of course, in order to dissipate 4 watts utilizing a different alloy, a different voltage may need to be supplied, or the dimensions and spacing of the element lines may need to be varied.

Preferably, when battery power source 14 is secured to cup 12, battery power source 14 supplies 3.6 volts so that heating element 26 dissipates 4 watts of power. This power is evenly dissipated throughout heating element 26 so that inner sidewall surface 18 is evenly heated.

Battery power source 14 is capable of being temporarily secured to outer bottom surface 24 so that battery power source 14 may keep heating element 26 energized to a predetermined level. Therefore, cup 12 and battery power source 14 are portable when secured together. Battery power source 14 includes at least one battery 30, a battery enclosure 32 for holding battery 30, and a moveable plate 34 slidingly received by battery enclosure 32. Battery 30 is coupled to a first pair of electrical contacts 36.

Battery enclosure 32 includes a sidewall 38 having an inner surface 40 and an outer surface 42, a bottom 44, and a stationary top 46. First pair of electrical contacts 36 protrude from a top surface 48 of stationary top 46. Springs 50 are utilized to urge plate 34 upward and away from top 46 when battery power source 14 and cup 12 are unattached. First contacts 36 are covered by plate 34 when cup 12 and battery power source 14 are unattached. When cup 12 and battery power source 14 are temporarily secured together, outer bottom surface 24 of cup 12 presses against plate 34 causing springs 50 to be compressed by plate 34. When plate 34 is pressed downward, first pair of contacts 36 are exposed through a pair of holes 52 in plate 34.

Battery enclosure 32 includes a pair of flanges 54 secured to inner surface 40 and extending from inner surface 40 of sidewall 38 into an interior of battery enclosure 32. Flanges 54 are temporarily received within a pair of grooves 56 in outer sidewall surface 20 of cup 12 when cup 12 is temporarily secured to battery power source 14. Flanges 54 are slanted at a 10 degree angle. Grooves 56 include a vertical portion and a slanted portion slanted at a 10 degree angle. Flanges 54 are first received in the vertical portion causing cup 12 to first slide straight down onto battery power source 14. Then, cup 12 is rotated to cause flanges 54 to slide into the slanted portion of grooves 56. As flanges 54 slide into the slanted portion of grooves 56, cup 12 is moved downward further into battery power source 14. This downward motion causes outer bottom surface 24 to push plate 34 downward, thus causing first contacts 36 to be exposed through holes 52. A second pair of contacts 58 are secured to outer bottom surface 24 of cup 12. First contacts 36 are coupled to second contacts 58 when flanges 54 are utilized to temporarily lock cup 12 onto battery power source 14. Preferably, second contacts 58 are a thin, flat surface contact flush with outer bottom surface 24 of cup 12.

Second pair of electrical contacts 58 are coupled to electrical leads 60 which are coupled to heating element 26. Second contacts 58 are temporarily coupled to first contacts 36 when cup 12 and battery power source 14 are temporarily secured together. In this manner, an electrical connection is made between second contacts 58 and first contacts 34 so that battery 30 may energize heating element 26.

Batteries 30 will eventually discharge to a level where batteries 30 will no longer deliver a sufficient power to energize heating element 26. In this case, batteries 30 will need to be recharged. Battery charger 16 is utilized to charge batteries 30 when battery power source 14 is temporarily secured to battery charger 16. Battery power source 14 includes a third pair electrical contacts 62 secured to bottom 44 of battery enclosure 32. Preferably, third contacts 62 are a thin, flat surface contact flush with outer bottom surface 44 of battery enclosure 32.

Battery charger 16 includes a base 64 which has a top 66 and a sidewall 68. The sidewall 68 has an inner sidewall surface 70 and an outer sidewall surface 72. A charging circuit 74 is enclosed within base 64. Charging circuit 74 may be any known type of charging circuit capable of recharging batteries 30. A fourth pair of electrical contacts 76 protrude from top 66 of base 64 and are electrically coupled to charging circuit 74 for charging battery power source 14 utilizing third 62 and fourth contacts 76. A moveable plate 78 is slidingly received by base 64 utilizing springs 80. Plate 78 is urged downward toward top 66 causing springs 80 to be compressed when battery power source 14 and battery charger 16 are attached. When plate 78 is urged downward, fourth contacts 76 are exposed through holes 77. Plate 78 is urged upward and away from top 66 when battery power source 14 and battery charger 16 are unattached causing plate 78 to completely cover fourth contacts 76.

Battery charger 16 includes a pair of flanges 82 secured to inner sidewall surface 70 of base 64 which extend from inner sidewall surface 70 into an interior of base 64. A pair of grooves 84 in outer sidewall surface 42 of battery power source 14 temporarily receive flanges 82 so that battery power source 14 is temporarily secured to battery charger 16. Battery power source 14 may be easily slid onto and off of battery charger 16 in this manner.

Beverage container 10 offers many advantages over the prior art. Cup 12 is watertight, thus permitting cleaning in a dishwasher. Further, cup 12 is less expensive to manufacture than typical devices which include heating elements secured to the bottom of the cup.

When cup 12 and battery power source 14 are attached, heating element 26 is constantly energized, thus keeping the liquid in cup 12 heated. In addition, cup 12 and battery power source 14 are portable when attached. Prior art devices which must be removed from the power source to be utilized allow the liquid to cool.

Further, because battery power source 14 is detachable, multiple different cups 12 can be utilized with a single battery power source 14. Or, multiple battery power sources 14 could be utilized with a single cup. A user could use one battery power source 14 to heat liquid and maintain the desired temperature during use. When the first battery power source 14 becomes discharged and needs to be recharged, the first battery power source 14 could be removed and replaced by a second battery power source 14 which is fully charged.

While the invention has been particularly shown and described with reference to a preferred embodiment, it will be understood by those skilled in the art that various changes in form and detail may be made therein without departing from the spirit and scope of the invention.

What is claimed is:

1. A heated beverage container, comprising:
    a cup having an inner sidewall surface, an outer sidewall surface, an inner bottom surface, an outer bottom surface, and a handle, wherein said inner sidewall surface and said inner bottom surface are shaped to hold liquid;
    a heating element completely enclosed between said inner sidewall surface and said outer sidewall surface for heating said inner sidewall surface to evenly heat said liquid, wherein said heating element is secured within said cup so that said cup is watertight,
    a top of a removable battery power source capable of being temporarily secured to said outer bottom surface for keeping said heating element energized while said battery power source is secured to said outer bottom surface, wherein said beverage container is portable when said power source is secured to said cup, and wherein said cup is capable of being submerged in water when said power source is removed without damaging said heated beverage container; and
    a removable battery charger capable of being temporarily secured to said battery power source a bottom of said removable battery power source capable of being removably, electrically coupled to a top of said removable battery charger such that the cup, battery power source, and battery charger rest upright when secured together.

2. The container according to claim 1 wherein said battery power source further comprises:
    a battery coupled to a first pair of electrical contacts;
    a battery enclosure for holding said battery including a sidewall having an inner surface and an outer surface, a bottom, and a stationary top, said first contacts being secured to a top of said stationary surface;
    a moveable plate slidingly received by said stationary top utilizing a spring for urging said plate upward and away from said stationary top when said battery power source and said cup are unattached so that said first contacts are covered by said plate.

3. The container according to claim 2 further comprising said spring being compressed when said cup is temporarily secured to said battery power source, said plate being urged downward toward said stationary top by said cup and said first contacts thereby being exposed through a pair of holes in said plate when said plate is urged downward.

4. The container according to claim 3 further comprising:
    a flange secured to said inner surface of said battery enclosure of said battery power source, said flange extending from said sidewall into an interior of said battery enclosure; and
    a groove in said outer sidewall surface of said cup for temporarily receiving said flange when said cup is temporarily secured to said power source.

5. The container according to claim 4 further comprising:
    electrical leads secured to said heating element;
    a second pair of electrical contacts secured to said outer bottom surface and connected to said electrical leads; and
    said second contacts coupled to said first contacts when said first contacts are exposed through said pair of holes in said plate, wherein said battery is electrically coupled to said heating element when said cup is temporarily secured to said battery power source.

6. The container according to claim 5 wherein said battery power source further comprises said battery being coupled to a third pair of electrical contacts secured to an outer surface of said bottom of said battery enclosure.

7. The container according to claim 6 wherein said battery charger further comprises:
    a charging circuit enclosed within a base, said base having a top, and a sidewall having an inner sidewall surface and an outer sidewall surface;
    a fourth pair of electrical contacts secured to said top of said base;
    a moveable plate slidingly received by said top utilizing a spring for urging said plate upward and away from said top when said battery power source and said battery charger are unattached so that said fourth contacts are covered by said plate.

8. The container according to claim 7 further comprising said spring being compressed when said battery charger is temporarily secured to said battery power source, said plate being urged downward toward said top by said battery power source and said third contacts thereby being exposed through a pair of holes in said plate.

9. The container according to claim 8 further comprising:
    a flange secured to said inner surface of said sidewall of said base, said flange extending from said sidewall into an interior of said base; and
    a groove in said outer sidewall surface of said base for temporarily receiving said flange when said battery power source is temporarily secured to said battery charger.

10. The container according to claim 1 wherein said battery power source further comprises:
    a battery coupled to a first pair of electrical contacts;
    a battery enclosure for holding said battery including a sidewall having an inner surface and an outer surface, a bottom, and a stationary top, said first contacts being secured to a top surface of said stationary top;
    a moveable plate slidingly received by said stationary top utilizing a spring for urging said plate upward and away from said stationary top when said battery power source and said cup are unattached so that said first contacts are covered by said plate.

11. The container according to claim 10 further comprising said spring being compressed when said cup is temporarily secured to said battery power source, said plate being urged downward toward said stationary top by said cup and said first contacts thereby being exposed through a pair of holes in said plate, when said plate is urged downward.

12. The container according to claim 11 further comprising:
    a flange secured to said inner surface of said battery enclosure of said battery power source, said flange extending from said sidewall into an interior of said battery enclosure; and a groove in said outer sidewall surface of said cup for temporarily receiving said flange when said cup is temporarily secured to said battery source.

13. The container according to claim 12 further comprising:

electrical leads secured to said heating element;

a second pair of electrical contacts secured to said outer bottom surface and connected to said electrical leads; and said second contacts coupled to said first contacts when said first contacts are exposed through said pair of holes in said plate, wherein said battery is electrically coupled to said heating element when said cup is temporarily secured to said battery power source.

14. A heated beverage container, comprising:

a cup having an inner sidewall surface, an outer sidewall surface, an inner bottom surface, an outer bottom surface, wherein said inner sidewall surface and said inner bottom surface are shaped to hold liquid;

a heating element completely enclosed between said inner sidewall surface and said outer sidewall surface for heating said inner sidewall surface to evenly heat said liquid, wherein said heating element is secured within said cup so that said cup is watertight;

a removable battery power source capable of being temporarily secured to said outer bottom surface for keeping said heating element energized while said battery power source is secured to said outer bottom surface, wherein said beverage container is portable when said power source is secured to said cup, and wherein said cup is capable of being submerged in water when said power source is removed without damaging said heated beverage container;

a removable battery charger capable of being temporarily secured to said battery power source;

said battery power source further comprising:
  a battery coupled to a first pair of electrical contacts;
  a battery enclosure for holding said battery including a sidewall having an inner surface and an outer surface, a bottom, and a stationary top, said first contacts being secured to a top of said stationary surface;
  a moveable plate slidingly received by said stationary top utilizing a spring for urging said plate upward and away from said stationary top when said battery power source and said cup are unattached so that said first contacts are covered by said plate;

said spring being compressed when said cup is temporarily secured to said battery power source, said plate being urged downward toward said stationary top by said cup and said first contacts thereby being exposed through a pair of holes in said plate when said plate is urged downward;

a flange secured to said inner surface of said battery enclosure of said battery power source, said flange extending from said sidewall into an interior of said battery enclosure;

a groove in said outer sidewall surface of said cup for temporarily receiving said flange when said cup is temporarily secured to said power source;

electrical leads secured to said heating element;

a second pair of electrical contacts secured to said outer bottom surface and connected to said electrical leads;

said second contacts coupled to said first contacts when said first contacts are exposed through said pair of holes in said plate, wherein said battery is electrically coupled to said heating element when said cup is temporarily secured to said battery power source;

said battery power source further comprises said battery being coupled to a third pair of electrical contacts secured to an outer surface of said bottom of said battery enclosure;

said battery charger further comprising:
  a charging circuit enclosed within a base, said base having a top, and a sidewall having an inner sidewall surface and an outer sidewall surface;
  a fourth pair of electrical contacts secured to said top of said base;
  a moveable plate slidingly received by said top utilizing a spring for urging said plate upward and away from said top when said battery power source and said battery charger are unattached so that said fourth contacts are covered by said plate.

15. The container according to claim 14 further comprising said spring being compressed when said battery charger is temporarily secured to said battery power source, said plate being urged downward toward said top by said battery power source and said third contacts thereby being exposed through a pair of holes in said plate.

16. The container according to claim 15 further comprising:

a flange secured to said inner surface of said sidewall of said base, said flange extending from said sidewall into an interior of said base; and a groove in said outer sidewall surface of said base for temporarily receiving said flange when said battery power source is temporarily secured to said battery charger.

* * * * *